United States Patent [19]
Cordoba

[11] 3,820,385
[45] June 28, 1974

[54] CHAMBER FOR TESTING SOILS WITH TRIAXIAL STRESSES

[76] Inventor: Raul J. Marsal Cordoba, c/o Instituto de Ingenieria, Ciudad Univ., Mexico City, Mexico

[22] Filed: Jan. 16, 1973

[21] Appl. No.: 324,124

[52] U.S. Cl. .................................. 73/84, 73/94
[51] Int. Cl. ............................................ G01n 3/08
[58] Field of Search ............ 73/84, 94, 88 E, 89

[56] References Cited
UNITED STATES PATENTS

| | | | |
|---|---|---|---|
| 2,090,475 | 8/1937 | Dinzl | 73/94 |
| 2,414,550 | 1/1947 | Patch | 73/94 |
| 2,811,038 | 10/1957 | Karol | 73/94 |
| 3,362,216 | 1/1968 | Haroin et al. | 73/94 |
| 3,457,777 | 7/1969 | Nielsen | 73/84 |
| 3,616,685 | 11/1971 | Strom | 73/84 |

Primary Examiner—James J. Gill
Attorney, Agent, or Firm—Holman & Stern

[57] ABSTRACT

A novel chamber for testing soils with triaxial stresses is disclosed, the chamber comprising a cylinder of Lucite, having a metal base and cap, into which cylinder is placed a sample of soil or material to be subjected to a confining pressure by the application of an axial load that is transmitted to the sample by means of a system of peripheral wires which apply the load downwardly, and a central wire which, like the other wires, passes to the outside of the chamber and transmits the deformations of the sample subjected to pressure to a micrometer supported on a plate which is connected to the upper wire.

4 Claims, 1 Drawing Figure

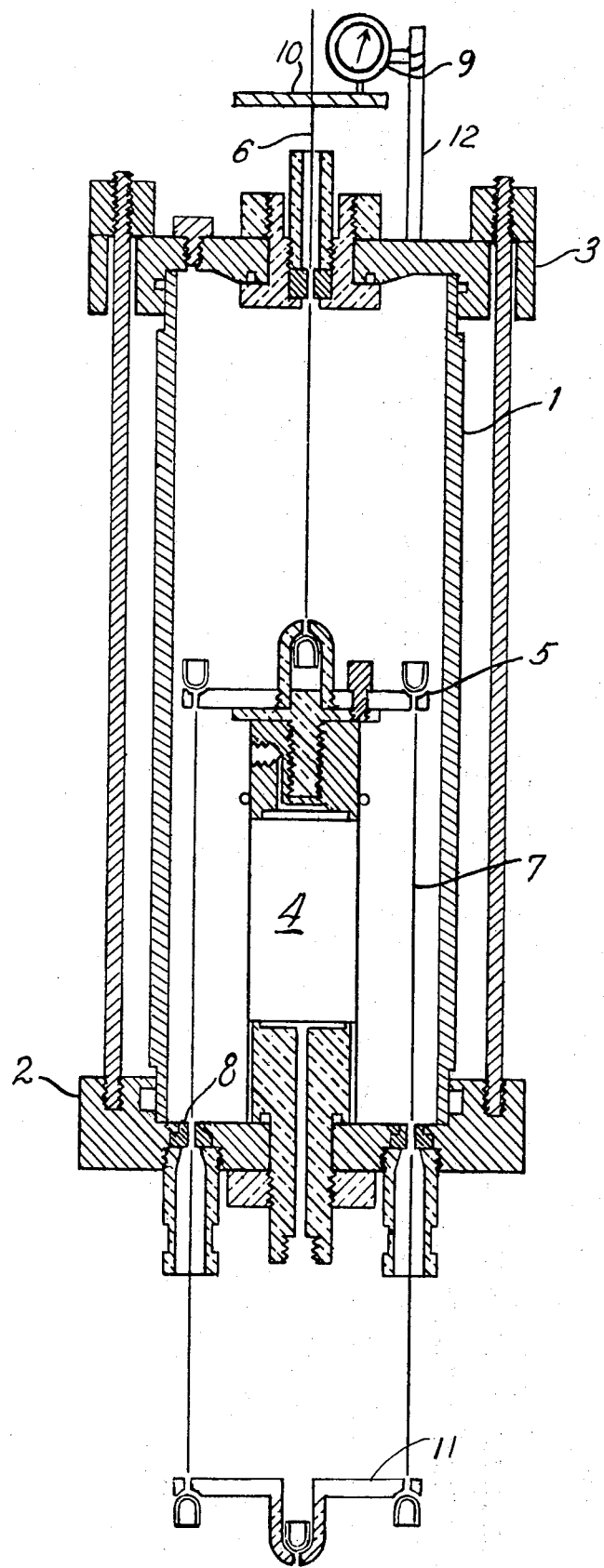

CHAMBER FOR TESTING SOILS WITH TRIAXIAL STRESSES

This invention generally relates to measuring and testing devices and particularly concerns a triaxial chamber of a well-known type for testing soil and the like under triaxial stresses. These chambers generally comprise a cylinder for holding the sample to be tested and subjected to a confining pressure by the application of an axially directed force and a force applied in a direction normal thereto by the action of a pressurized liquid surrounding the sample within the chamber. The present invention however contemplates a novel method and apparatus for applying the axially directed forces to the sample within the chamber and generally comprises a cylinder of Lucite, having a metal base and cap, into which cylinder is placed a sample of soil or material to be subjected to a confining pressure by the application of an axial load and a force applied in a direction normal thereto in the well-known manner by the action of a pressurized liquid surrounding the sample within the chamber. The axial load is transmitted to the sample by means of a system of peripheral wires which are used to apply the load downwardly, and a central wire which, like the peripheral wires, passes to the outside of the chamber. The deformations of the sample subjected to pressure in the axial direction are transmitted to a micrometer supported on a plate which is connected to the central wire exteriorly of the chamber.

The object of the invention therefore is to eliminate the disadvantages of prior known triaxially stressed soil testing chambers wherein the axially directed stress is transmitted to the test specimen utilizing piston-bushing, both lubricated, a piston and bushing with ball bearings, a rotary piston and fixed bushing, and a piston and rotary bushing, by providing a triaxially stressed testing chamber having simplicity of construction in comparison with the above-mentioned systems, which employs the use of peripheral wires to apply the axial stress to the sample so as to reduce the friction which the axial stress applied as in the prior-known systems to the specimen or sample subjected to analysis, produces.

The characteristic details of the chamber for testing soils with triaxial stresses are clearly shown in the drawings of the present specification. As an illustration of a preferred inventive embodiment, the single drawing FIGURE shows a section of the invention.

With reference to the FIGURE, the chamber comprises a cylinder of Lucite or of any other suitable material 1, having a metal base and cap 2 and 3, respectively, inside of which chamber is placed the sample (4) which is to be analized the sample being subjected to confining pressure composed of an axially directed force and a force normal thereto which normally directed force is effected by a pressurized fluid surrounding the sample 4 within the cylinder 1 in the well-known manner.

The axial load to be applied to the sample (4) to be analyzed and transmitted thereto by means of a metal plate 5, to which is connected a central wire 6, and three peripheral wires 7. All of the wires pass to the outside of the chamber through bushings 8 of teflon with molybdenum bisulfide. As may be clearly seen from the drawing, central wire 6 is also attached to a plate 10 disposed outside of the chamber, while the wires 7 are attached to a plate or platform 11 also disposed outside the lucite chamber 1. A micrometer 9 is operatively retained on the plate 10 and supported by the bar 12. The axially directed force is applied to the sample 4 by applying a load to the platform 11 which thereby places wires 6 and 7 in tension. As will be appreciated, downward movement of the plate 5 will indicate deformation of the specimen 4 under the action of the load applied to the plate 11. This movement will be transmitted to plate 10 since plate 5 and plate 10 are interconnected by wire 6. Thus plate 10 will incur a similar downward displacement to that of plate 5 and since plate 10 is operatively connected to the micrometer 9 a measurement of this displacement which is equal to the deformation of the sample 4 under load can be effected.

What is claimed is:

1. In a triaxial chamber for testing soil samples and the like disposed therein and having the first means subjecting the sample to an axially directed force and second means subjecting the sample to a force applied in a direction substantially normal thereto under the action of a pressurized fluid surrounding the sample within the chamber, which normally directed force is maintained constant during a sample testing procedure, the improvement wherein said first means comprises:

force-application means disposed within said chamber and operatively associated with the sample contained therein;

at least three wires one end of each of which is attached to said force-application means, said wires being disposed in said chamber in a direction substantially axially of the sample contained therein;

at least one other wire attached at one end thereof to said force-application means and being disposed in said chamber in a direction opposite to that taken by said three wires and substantially axially of the sample contained in said chamber;

measuring means operatively connected to the other end of said one other wire whereby when a load is applied to the other ends of each of said three wires to provide said axially directed force to the sample, said one other wire and said three wires are placed in tension and the force of said load is transmitted to said force-application means through said three wires to cause compression of said sample, a resulting displacement of said force-application means when said compression produces deformation of said sample causing consequent movement of said one other wire, which movement is measured by said measuring means operatively connected thereto.

2. A triaxial chamber as defined in claim 1 wherein said force-application means is a plate disposed on said sample to be tested, said three wires being attached thereto and peripherally thereof while said one other wire is attached centrally of said plate.

3. A triaxial chamber as defined in claim 1 wherein said three wires and said one other wire extend exteriorly of said chamber through teflon-molybdenum bushing disposed in the walls thereof.

4. A triaxial chamber as defined in claim 1 wherein said measuring means comprises a micrometer and a movable plate connected to said other end of said one other wire whereby when said force-application means is displaced said movable plate actuates said micrometer to provide a measurement of the deformation of the sample to be tested.

* * * * *